(12) United States Patent
Oksman et al.

(10) Patent No.: US 7,519,124 B2
(45) Date of Patent: Apr. 14, 2009

(54) METHOD FOR SEAMLESS BIT RATE ADAPTATION FOR MULTICARRIER DSL

(75) Inventors: Vladimir Oksman, Morganville, NJ (US); Bernd Heise, München (DE)

(73) Assignee: Infineon Technologies AG, Munich (DE)

( * ) Notice: Subject to any disclaimer, the term of this patent is extended or adjusted under 35 U.S.C. 154(b) by 592 days.

(21) Appl. No.: 11/129,162

(22) Filed: May 13, 2005

(65) Prior Publication Data

US 2006/0256846 A1 Nov. 16, 2006

(51) Int. Cl.
*H04K 1/10* (2006.01)
(52) U.S. Cl. .................. 375/260; 375/219; 375/222; 714/758; 370/395.64
(58) Field of Classification Search .................. 375/231; 714/758; 370/294
See application file for complete search history.

(56) References Cited

U.S. PATENT DOCUMENTS 6,219,378 B1* 4/2001 Wu .............................. 375/231

2004/0044942 A1* 3/2004 Tzannes ...................... 714/758

FOREIGN PATENT DOCUMENTS

WO WO 02/058310 A2 7/2002

* cited by examiner

*Primary Examiner*—David C Payne
*Assistant Examiner*—Adolf DSouza
(74) *Attorney, Agent, or Firm*—Eschweiler & Associates, LLC

(57) ABSTRACT

A method of mitigating transmission delay fluctuations in a communication system having a variable data rate and block-oriented subsystems, such as interleavers. The method comprises interspersing dummy data with genuine data to form a combined data stream for the subsystems. When the data rate decreases, the rate at which dummy data is supplied increases to stabilize the delay. In one embodiment, the dummy data is discarded prior to transmission and may be reintroduced as needed on the receiving end. In another embodiment, the dummy data is transmitted and only discarded after processing at the receiving end. For this later embodiment in a multitone system, the dummy data can be sorted onto separate sub-carriers for transmission and the power levels for those carriers can be dropped to reduce overall power consumption and crosstalk. The concept can be used to extend seamless rate adaptation to systems with forward error correction.

9 Claims, 2 Drawing Sheets

METHOD FOR SEAMLESS BIT RATE ADAPTATION FOR MULTICARRIER DSL

FIELD OF INVENTION

The present invention relates generally to communication systems and more particularly to variable bit rate communication methods using Digital Subscriber Line (DSL).

BACKGROUND OF THE INVENTION

Digital subscriber line (DSL) technology provides high-speed data transfer between modems across ordinary (e.g., twisted copper pair) telephone lines. DSL supports digital data transfer rates from tens of Kbps to tens of Mbps, while still providing for plain old telephone service (POTS). Asynchronous Digital Subscriber Line (ADSL) and Very High Rate Digital Subscriber Line (VDSL) have emerged as popular implementations of DSL systems, where ADSL standards are defined by American National Standard Institute (ANSI) standard T1.413 and International Telecommunication Union (ITU-T) standards G.992.3, G.992.5, and VDSL standards are defined by ANSI standard T1.424 and ITU-T standard G.993.1. ADSL, VDSL and other similar DSL systems (collectively referred to as "xDSL") typically provide digital data transfer in a frequency range above the POTS band (e.g., about 300 Hz to 4 kHz), for example ADSL G.992.3 operates at frequencies from about 25 kHz to about 1.1 MHz.

Most DSL installations are operated using Discrete Multi Tone (DMT) modulation, in which data is transmitted by a plurality of sub-carriers (tones), sometimes alternatively referred to as subchannels, sub-bands, carriers, or bins, with each individual subcarrier utilizing a predefined portion of a prescribed frequency range. In ADSL, for example, 256 sub-carriers are used, with each sub-carrier having a bandwidth of 4.3125 kHz. The digital data is encoded and modulated at the transmitter using Quadrature Amplitude Modulation (QAM) for each subcarrier and Inverse Discrete Fourier Transform (IDFT) to create the modulated multicarrier signal for transmission along the DSL loop or channel, which is then demodulated at the receiving end and decoded to recover the transmitted data. The bits of data to be transmitted over each subcarrier are encoded as signal points in QAM signal constellations using an encoder or a bit mapping system. Signal points are then modulated onto the corresponding sub-carriers. The combined signals are often referred to as a symbol, e.g., a DMT symbol. The total number of data bits transmitted over the channel is a sum of the bits transmitted by each subcarrier.

In most types of communication systems, it is desirable to maximize the rate at which data is successfully transferred across the communication medium, sometimes referred to as the bit rate or data rate. The maximum data rate, in turn, depends on the noise characteristics of a particular communication channel. In the case of DSL systems, a pair of modems is connected by a twisted pair of wires (sometimes referred to as a loop) that provides the communication medium. In this situation, noise may be generated by signals on neighboring wire pairs (i.e., crosstalk noise) in a distributed telephony system, as well as by outside sources of Radio Frequency Interference (RFI) or other noise. Noise on a particular communication channel may generally be characterized as either continuous noise or impulse noise. Continuous noise can usually be modeled as Additive Gaussian Noise (AGN) with randomly distributed values of noise over time, whereas impulse noise is generally short bursts of relatively high levels of channel noise. Various mechanisms or techniques are employed in DSL and other communication systems to combat continuous and impulse noise and/or to correct noise-related data transfer errors.

Continuous noise is typically addressed by transmitting fewer data bits over sub-carriers with higher continuous noise levels, and more data bits over sub-carriers with lower continuous noise levels. The allocation of data bits to particular sub-carriers may be referred to as bit allocation, bit distribution, or bit loading. The bit distribution parameters may be adapted to changing noise conditions on the channel. The initial bit distribution settings or parameters are selected according to subcarrier noise assessments made during system initialization. DSL systems provide for periodic reassessment of continuous noise conditions and adaptive tuning of the bit distribution parameter settings to accommodate changes. Adaptive tuning may include bit swapping, bit rate adaptation, and bandwidth repartitioning techniques, each of which involve changes to a number of modulation parameters.

Bit swapping does not change the total data rate of the communication channel, but serves to increase or maintain continuous noise immunity by reallocating data bits from noisy sub-carriers to more noise-free sub-carriers. Where the channel noise increases significantly, bit swapping alone may not be adequate to prevent data transmission errors and bit rate adaptation may be employed. Bit rate adaptation involves changing the total number of bits transmitted over all subcarriers. When noise conditions became worse, bit rate adaptation decreases the number of data bits transmitted over some or all sub-carriers. If the continuous channel noise level subsequently decreases, then the number of data bits can be again increased.

Adaptive tuning can effectively address continuous noise conditions, but impulse noise protection requires a different approach. Impulse noise in DSL systems usually causes erasure of an entire signal for a relatively short period of time, regardless of the number of bits allocated to the channel or to particular sub-carriers. Impulse noise can be addressed in DSL and other communication systems by applying forward error correction (FEC) with interleaving (IL).

An FEC encoder generates a certain number of redundancy bytes for each block of transmitted data. The redundancy bytes are added to the data blocks to form FEC codewords. At the receive side, an FEC decoder uses the redundancy bytes to recover (correct) up to a certain number of corrupted data bytes in the block, and thereby ensures that when a small number of bytes in a codeword are corrupted, the original data transmitted in the codeword can be recovered. In general, the number of error bytes that can be corrected by FEC is half of the number of redundancy bytes included in the codeword. Increasing FEC redundancy to provide further FEC protection against noise decreases the data rate, and vice versa, whereby the goals of noise protection and data rate involve a tradeoff.

To combat relatively severe impulse noise, FEC encoders are generally implemented with data interleaving. After the addition of FEC redundancy bytes, an interleaver (at the transmit side) segments the FEC codewords or blocks into smaller portions (segments, usually byte-long) with segments from different codewords being mixed in a certain order prior to modulation. The ordering of segments is such that segments belonging to the same FEC codeword are separated from each other. This results in bytes of the same codeword being spread out over time, whereby impulse noise corruption of the transmitted stream of data during any given short period of time results in corruption of only one or a few bytes belonging to a particular codeword or block, causing fewer errors in each reassembled (e.g., de-interleaved) codeword at the receive side. Thus, interleaving spreads the effects of impulse noise pulses over multiple FEC codewords, whereby the amount of corrupted data in each codeword is less and the effect of occasional long bursts of noise can be reliably corrected with fewer redundancy bytes per codeword.

An implementation issue arises when FEC and interleaving are combined with bit rate adaptation. Bit rate adaptation is used to maximize available bandwidth while controlling noise, as discussed previously. In addition, rate adaptation is particularly desirable in DSL systems, especially VDSL systems, where customers usually are not using simultaneously all the services they subscribe to and do not require the full available band width most of the time. For example, video service usual provides for the use of two or three independent TV sets simultaneously with data and voice services. In practice, most subscribers are using no more than one of these services at a time.

High bandwidth requires high power consumption and induces high levels of cross-talk between adjacent lines. Reducing the bandwidth reduces heating in cabinets, reduces cross-talk, and improves network reliability. Therefore, it is highly desirable to reset the bandwidth and the transmit power in response to varying customer demands as well as in response to variation in continuous line noise.

Preferably, rate adaptation should be preformed seamlessly, meaning without interruption or reduction in quality for services that are used continuously through the period of bit-rate change. For example, if a user switches off a TV set, the power and bandwidth are preferably reduced without causing distortions, changes, or degradation in other services (such as transmissions to other TV sets or computer games) that remain in use.

Seamless rate adaptation (SRA) techniques for multi-carrier transmissions are well known. For example, international standards for ADSL based on DMT specify SRA procedures that change the total bit-rate by changing the number of bits on each sub-carrier. The total power can then be reduced by reducing the power for sub-carriers with reduced bit loading or by temporarily switching off the power for sub-carriers with zero bit loading. Special synchronization flags are provided to ensure the desired changes in bit-loading and power level are applied for exactly the same DMT symbols at both sides of the line.

Conventional SRA techniques, however, do not specify SRA over communication paths that include interleavers. The reason is that interleavers operate on blocks of data, whereby an output block cannot be generated until several input blocks have been received. The time required to receive the input blocks causes a transmission delay, which increases when the data rate slows. For example, if k blocks are involved and the data rate is halved, the time required to receive k blocks will be the same as the time required to receive 2 k blocks at the original data rate. Accordingly, the delay will be approximately doubled. Delay variations caused by bit rate variation affects some services, making rate adaptation not seamless. Furthermore, the delays can increase to unacceptable levels. In fact, unacceptable delay levels would occur routinely because the interleaver delay is usually at the edge of the allowed limit, with impulse noise protection being maximized subject to this limit.

Another issue is that the degree of impulse noise protection changes with SRA. When the bit rate for the line increases, more bits are carried in each unit of time. Thus, more bits will be corrupted by the same impulse noise event (which usually corrupts the transmission for a certain period of time). As a result, an impulse noise event that would not cause uncorrectable errors before SRA, will cause uncorrectable errors after SRA. The degree of impulse noise protection (INP) is reduced while the depth of interleaving remains constant.

In principle, the interleaver depth could be adjusted to mitigate variations in delay and in INP. In practice, changing the interleaver depth is a complex task in that changing the interleaver depth requires dynamic re-allocation of the interleaver memory, which must be carried out without corrupting the bytes of data already in the memory. This complexity is one of the reasons that current international standards for ADSL do not specify SRA over channels that include interleavers. Accordingly, there has been a long felt need for compatible SRA and impulse noise protection methods for DSL and other communication systems.

SUMMARY OF THE INVENTION

The following presents a simplified summary in order to provide a basic understanding of one or more concepts of the inventors. This summary is not an extensive overview of ever one of the inventors' concepts, and is neither intended to identify key or critical elements of these concepts, nor to delineate the scope thereof. Rather, the primary purpose of the summary is to present some concepts of the inventors in a simplified form as a prelude to the more detailed description that is presented later.

One concept of the inventors relates to a method of operating an electronic subsystem such as an interleaver in a DSL system. The method mitigates transmission delay variations resulting from bit rates changes and can be used to extend SRA techniques to systems having communication pathways comprising FEC encoders and interleavers. The method comprises interspersing dummy data with genuine data to form a combined data stream that is supplied to the subsystem. The rate at which dummy data is supplied increases in response to decreases in the bit-rate for genuine data. The combined data stream has a bit rate that is more steady than then the genuine data stream. Because the electronic subsystem acts upon the combined data stream rather than the genuine data stream alone, delay variations caused by bit-rate variations are mitigated or cancelled by the addition of the dummy data. Moreover, the method generally also has the effect of mitigating or canceling variations in impulse noise protection (INP).

In one embodiment, the dummy data is discarded prior to transmission. Optionally, the dummy data is carried through several electronic subsystems prior to being discarded. For example, the dummy data may be introduced before an FEC encoder, carried through the FEC encoder and an interleaver, and then discarded prior to modulation of the data stream into DMT symbols. A similar process can be carried out on the receiving end to mitigate variations in channel delay caused by a de-interleaver and a FEC decoder, for example.

In another embodiment, the combined data stream, including the dummy data, is transmitted over a transmission line. The dummy data can be discarded on the receiving end, preferably after the dummy data has been carried through one or more peer electronic subsystems on the receiving end thereby mitigating variations in delay caused by processing at the receiving end. For transmission, the dummy data can be placed onto separate sub-carriers from the data of the first data stream. In one embodiment, the power for sub-carriers carrying dummy data is greatly reduced, whereby the benefits of reduced bandwidth can be realized even if the bandwidth does, in some sense, remain unchanged. Errors resulting from the reduced power levels only affect the dummies and are inconsequential. The dummy data can be ignored or reconstructed at the receive end, whereby processing can continue as though the dummy data were transmitted normally. The transmission preserves the locations of the dummy bytes in the bit stream, but need not preserve their contents. In another embodiment, power levels for sub-carriers transmitting genuine data are also reduced, after bit swapping, to further reduce overall power levels and crosstalk The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
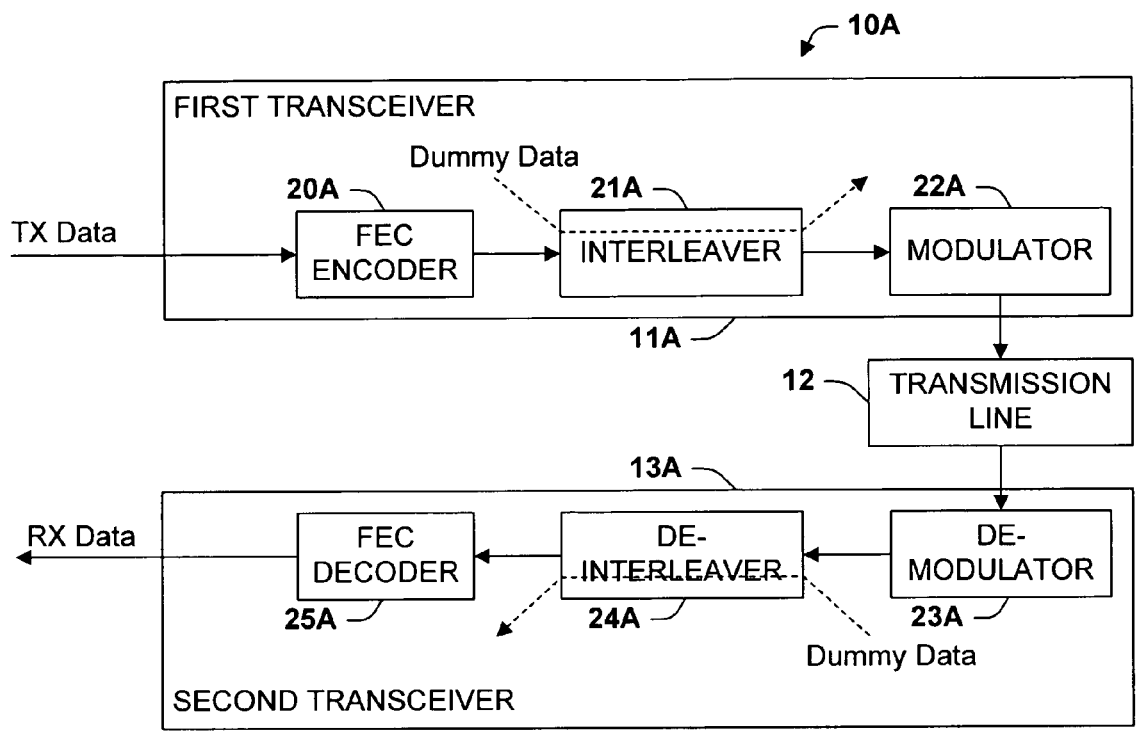
FIG. 1 is a schematic diagram illustrating an exemplary multicarrier DSL communication system in accordance with one concept of the inventors.

One or more implementations of the present invention will now be described with reference to the attached drawings, wherein like reference numerals are used to refer to like elements throughout.

FIG. 1 is a schematic illustration of a communication system 10A according to one concept of the inventors. The communication system 10A comprises a first transceiver 11A, a transmission line 12, and a second transceiver 13A. Each of the first and second transceivers 11A and 13A comprises a plurality of electronic subsystems. Electronic subsystems of the first transceiver 11A include, without limitation, FEC encoder 20A, interleaver 21A, and modulator 22A. Electronic subsystems of the second transceiver 13A include, without limitation, demodulator 23A, de-interleaver 24A, and FEC decoder 25A.

A first data stream is supplied to the first transceiver 11A by a transmit data source. The first data stream is processed by FEC encoder 20A, which inserts redundancy bytes into the first data stream at the end of each block of data to form codewords. The first data stream is then written to the interleaver 21A. The transceiver 11A generates dummy data, which it inserts into the data stream as it is written to the interleaver 21A, interspersing the dummy data with the first data stream to form a combined data stream. As the combined data steam is read from the interleaver 21A and transmitted to the modulator 22A, the first transceiver 11A removes the dummy data, whereby only the first data stream is passed to the modulator 22A. The first data stream is then transmitted from the first transceiver 11A to the second transceiver 13A over the transmission line 12.

The dummy data can be inserted into the first data stream in any suitable fashion. One option is to generate the dummy data in the FEC encoder 20A, whereby the output of that subsystem is the combined data stream. Another option is to create the dummy data by advancing a write pointer within the interleaver at appropriate times in between writing consecutive bytes from the first data steam.

In this example, the bit values within the dummy data are immaterial and only the placement of the dummy data is of any consequence. Any convenient dummy data placement pattern that stabilizes the delay characteristics of the interleaver can be used. The placement pattern must be deterministic or communicated, whereby the first transceiver 11A can locate and remove the dummy data before writing the dummy data to the modulator 22A.

Any suitable placement pattern can be used for the dummy data, with dummy data being inserted in groups of one or more bits, generally one or more bytes. A placement pattern may involve placing one or more dummy bytes between each pair of consecutive bytes of the first data stream. Another placement pattern may involve placing one dummy byte between every k first data stream bytes, where k is a positive integer. A further placement pattern may involve interspersing blocks of dummy data the length of FEC codewords with genuine FEC codewords read from the FEC encoder 20A.

Preferably, a similar operation occurs at the receiving end. The transceiver 13A receives the first data stream from the first transceiver 11A over the transmission line 12. The data is first processed by the demodulator 23A. As the first data stream is being transmitted from the demodulator 23A and written into the de-interleaver 24A, the transceiver 13A intersperses dummy data with the first data stream to form a combined data stream. As the combined data stream is read from the de-interleaver 24A and transmitted to the FEC decoder 25A, the second transceiver 13A removes the dummy data, whereby the FEC decoder 25A receives the same data stream and codewords as generated by the FEC encoder 20A. As on the transmit side, the content of the dummy data is immaterial. In this example, both insertion and removal of dummy data can be accomplished entirely with pointers without actually reading or writing any dummy data.

Of the subsystems in a transceiver, interleavers and de-interleavers commonly introduce the most delay and by passing dummy data through the interleaver and de-interleaver, most of the delay can generally be mitigated, however, other electronic subsystems that operate on blocks, such as certain FEC encoders and FEC decoders, can also introduce delay and that delay can be further mitigated by passing dummy data through these electronic subsystems and any other electronic subsystems that operate on blocks as well.

Figure 2:
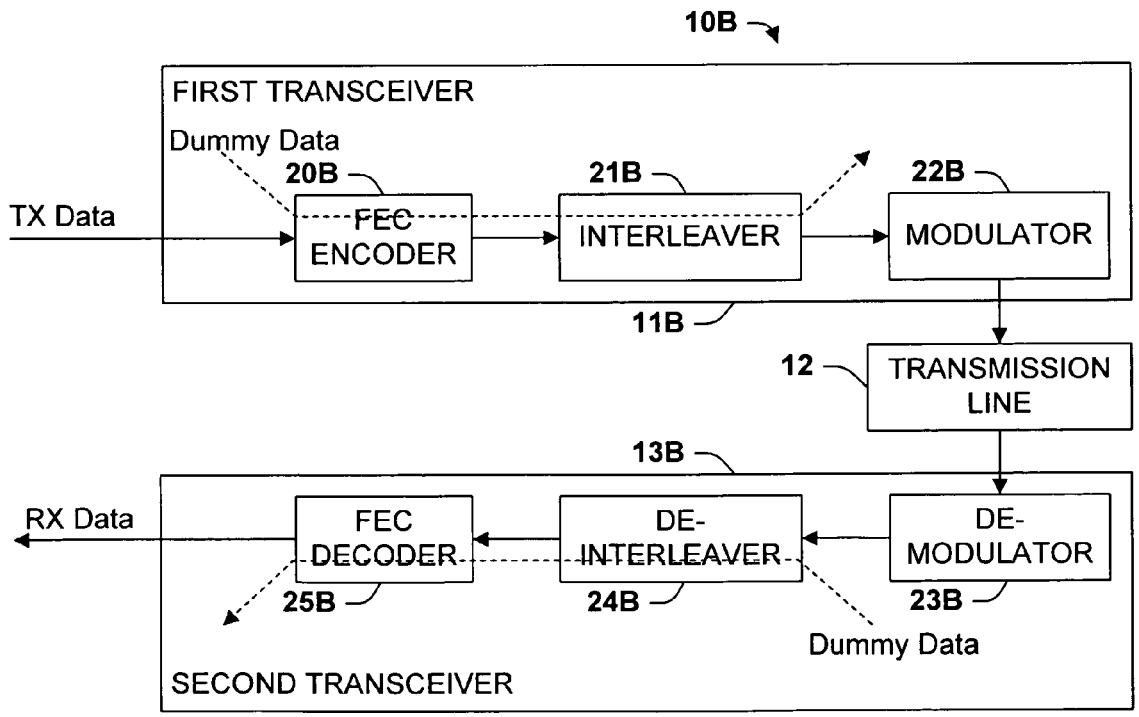
FIG. 2 is a schematic diagram illustrating an exemplary multicarrier DSL communication system in accordance with another concept of the inventors.

FIG. 2 is a schematic illustration of a communication system 10B showing another concept of the inventors. For the sake of brevity, a parallel numbering scheme with FIG. 1 is used, although structure and/or programming for similar units may vary in accordance with the differences between the two embodiments or concepts. In this concept, dummy data is inserted before the FEC encoder 20B and removed as the data is read from the interleaver 21B and written to the modulator 22B. At the received end, dummy data is inserted as the data is transmitted from the de-modulator 23B and written to the de-interleaver 24B, and the dummy data is discarded after the combined data stream is processed by the FEC decoder 25B.

In the system 10B, depending on the implementation, the content of the dummy data can make a difference. In one approach, blocks of dummy data replace blocks of data, whereby each data block processed by the FEC encoder 20B contains either no dummy data or entirely dummy data. When the dummy data is discarded by the transceiver 11B, the redundancy bytes corresponding to the dummy data can be discarded as well. At the receive end, codeword-length blocks of dummy data are intersperse between whole FEC codewords. The dummy data can be given values that make them valid FEC codewords or the FEC decoder 26B can be allowed to generate error signals that are ignored for dummy codewords.

Another approach is to intersperse dummy data with original data in the FEC encoder 20B. In this case the codewords will have values that depend on the dummy data. None of the redundancy bytes for these codewords are removed when the dummy data is discarded from the combined data stream by the transceiver 11B, whereby all the redundancy bytes are transmitted along with the first data stream. At the transceiver 13B, the removed dummy data is re-inserted at the same locations with the same values. This is accomplished by synchronizing the transceivers 11B and 13B, whereby shared rules or algorithms determine the values to assign the dummy data, as well as their locations.

Figure 3:
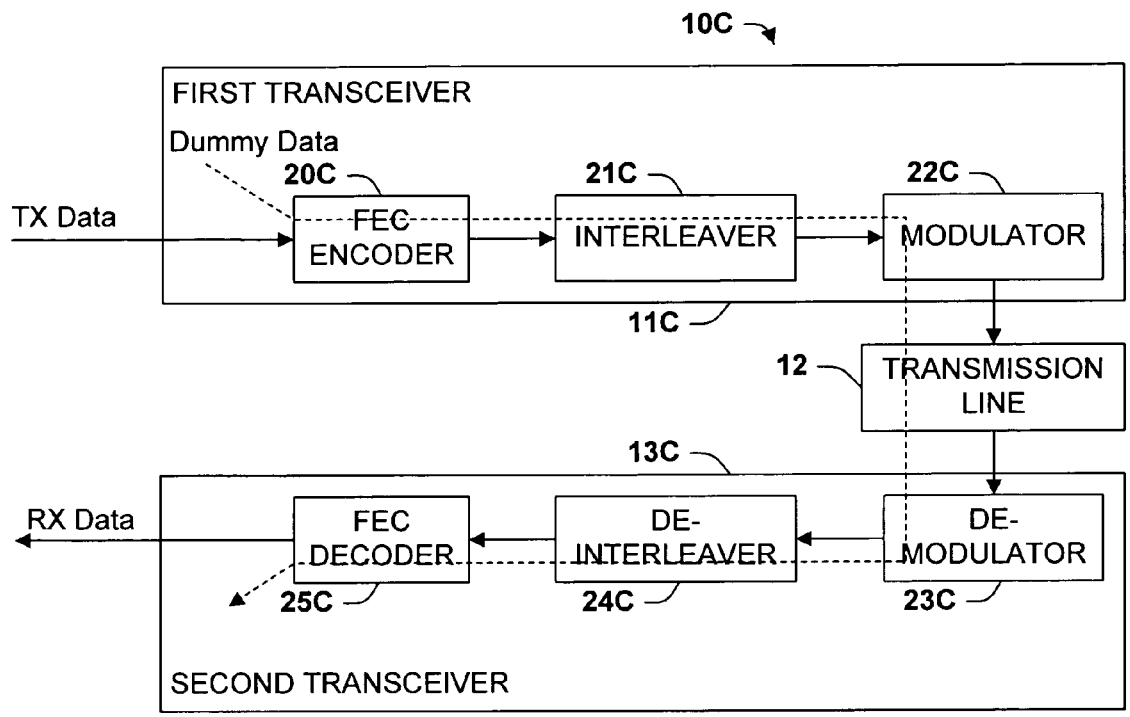
FIG. 3 is a schematic diagram illustrating an exemplary multicarrier DSL communication system in accordance with a further concept of the inventors.

FIG. 3 is a schematic illustration of a communication system 10C implementing another concept of the inventors. In this example, dummy data is inserted into the first data stream before the first data stream enters the FEC encoder 20C. The dummy data is transmitted across the line 12 along with the first data stream, and are not removed until the combined data stream has been processed by the FEC decoder 26.

If the dummy data is transmitted normally, adding and removing the dummy data is a trivial matter in that the dummy data can be placed in any convenient manner and only the locations of the dummy data need be synchronized between the transceivers 11C and 13C. In a preferred embodiment, however, the dummy data is transmitted at high error rates, whereby the transmission preserves only the locations of the dummy bits and allows the contents of the dummy bits to become corrupted.

One approach that allows for dummy data corruption is to provide the dummy data only in blocks that form whole FEC codewords. Using this approach, the FEC decoder 25C will receive the original data in whole uncorrupted FEC codewords. The dummy data will also be received in whole FEC codewords. The codewords for the dummy data will likely have uncorrectable errors, however, the transceiver 13C can simply ignore these errors.

Another approach is to have the transceiver 13C reconstruct the dummy data. The reconstruction can take place anywhere from the point of demodulation up until processing by the FEC decoder 26C. The transceiver 11C assigns the dummy data according to a predetermined formula and the transceiver 13C reconstructs the dummy data using this same formula. In this example, the dummy data can be interspersed with original data within FEC codewords, however, care must be taken to transmit with clarity the redundancy portion of every FEC codeword that contains original data. Generally, this means that the redundancy portion of every FEC codeword must be transmitted with clarity, in contrast to the case where dummy data is segregated into separate codeword blocks. When the original data is distributed among all the codewords and all the redundancy bytes are transmitted clearly, the INP of the system will be improved: the dummy data is known, whereby the redundancy bytes need only be applied to correcting errors among the original data.

Figure 4:
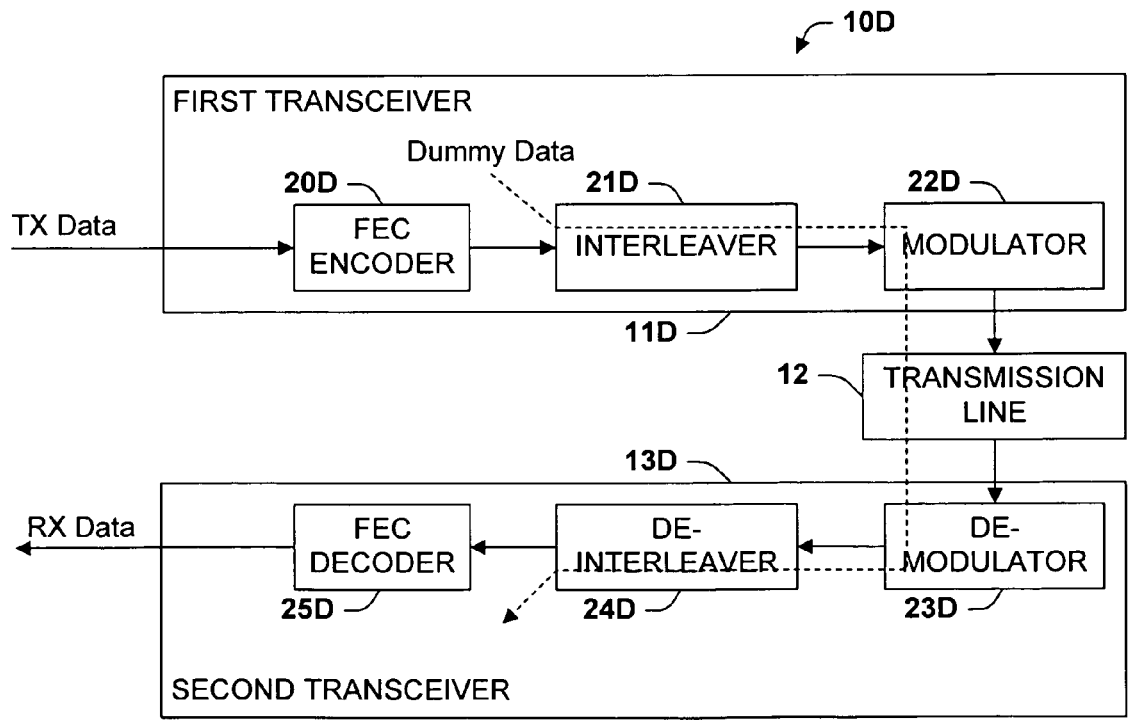
FIG. 4 is a schematic diagram illustrating an exemplary multicarrier DSL communication system in accordance with a still further concept of the inventors.

FIG. 4 is a schematic illustration of a communication system 10D implementing another concept of the inventors. In this example, the dummy data is inserted between the FEC encoder 20D and the interleaver 21D within the first transceiver 11D, transmitted with the first data stream in a combined data stream over the transmission line 12, and removed between the de-interleaver 24D and the FEC decoder 25D. In this example, once again the content of the dummy data is generally immaterial and only the locations of the dummy data need be synchronized. Dummy data insertion and removal can be carried out entirely with pointers, with no actual reading or writing of data.

For some implementations of the embodiments show in FIGS. 3 and 4 there may be circumstances in which making the dummies all ones or all zeroes can have an adverse effect on transmission or interpretation of the transmitted data. In such circumstances, a pseudo random number generating algorithm can be used to generate the dummy bit values. If the dummy data is created by shifting pointers in an interleaver, the existing contents of the interleaver may provide the desired transmission characteristics.

For the concepts exemplified by FIGS. 3 and 4, where the dummy data is transmitted, it is preferred that the dummy data is transmitted in a manner that allows the signal power to be reduced in comparison to the power required to normally transmit all the bits in the combined data stream. This generally comprises sending the dummy data at error rates that would be unacceptable for meaningful data.

In one embodiment, following a reduction in bandwidth and the introduction of dummies, the power level for one or more sub-carriers is reduced. At reduced power levels, the clear transmission bit capacities for the affected sub-carriers will generally be reduced. At least the data which must be clearly transmitted is placed on a first group of sub-carriers that are kept within their clear transmission bit capacity limits. The rest of the data, including dummies, is placed on a second group of sub-carriers at bit-loadings exceeding their clear transmission bit capacity limits.

The sorting and separating of dummy and original data when forming DMT symbols can become complicated if the ratio between dummy and original data varies from symbol to symbol. To avoid this complexity, the number of bits per symbol can be set to provide an integral number of bytes and a fixed ratio between dummy and original data for each DMT symbol. For example, if there are four dummy bytes for each original data byte, the number of bits transmitted with each symbol can be reduced to the nearest multiple of 40. Rather than alter the actual DMT symbol size, unused bandwidth can be filled with additional dummy data inserted during modulation. A more preferable technique is to reserve bandwidth for dummies and bandwidth for data each in excess of the actual bit rate for the corresponding data. In this technique, the number of each type of bit is allowed to vary from symbol to symbol, again with unused bandwidth being filled with additional dummies. A still more preferably technique reserves bandwidth for original data representing a maximum demand and shifts a number of dummies that varies from symbol-to-symbol into the associated sub-carriers. The dummy data insertion pattern can be chosen in view of the selected technique to reduce a cost, such as increased power requirement, associated with the selected technique.

The clear transmission bit capacity limit for a sub-carrier is the maximum number of bits that can be transmitted on that sub-carrier within a specified maximum error rate and SNR margin. The maximum error rate for a DSL system is typically specified at approximately $10^{-7}$ and the SNR margin is typically 6 dB. As a rule of thumb, the clear transmission bit capacity limit decreases by 1 bit for each 3 dB reduction in power level.

If a sub-carrier transmits only dummies, an SNR margin is not required and the power level can be reduced by 6 dB on that account. Moreover, the maximum error rate can be increased. For example, if the maximum error rate for dummies is increased to $10^{-3}$, the power level can be reduced by another 3.5 dB.

In one embodiment, only the power levels for sub-carriers transmitting dummies are reduced. In a method according to this embodiment, dummy insertion is begun to replace bandwidth that is no longer in use. Next, the system begins sorting dummies onto separate sub-carriers. Lastly, the system reduces the power levels for the sub-carriers assigned to dummies only.

In another embodiment, the power levels for at least some sub-carriers transmitting genuine data are also reduced after reducing the data bit loading on those sub-carriers. The bit-loadings for genuine data sub-carriers can be reduced by swapping the dummies in a smaller group of sub-carriers while increasing the number of sub-carriers available for genuine data. Swapping the dummies into a smaller group of sub-carriers is possible because just as 9 fewer dB are required for a sub-carrier at fixed bit loading when the sub-carrier transmit dummies instead of data, three more bits can be transmitted on a sub-carrier at fixed power level when the sub-carrier transmits dummies. Some dummies can even be swapped onto certain sub-carriers that have too little SNR to transmit any genuine data bits.

In a method according to this embodiment, dummy insertion is first begun. Next, the system begins sorting dummies onto separate sub-carriers. Next, the system begins swapping dummy bits off some sub-carriers and onto others, loading those other sub-carriers in excess of their normal transmission bit capacities. Simultaneously, the system swaps genuine data bits onto sub-carriers from which dummies have been removed. Lastly, the system reduces the power levels for some or all sub-carriers.

The foregoing embodiments illustrate that there are many options for loading the bits. The optimal bit loading will depend on the particular environment and can be determined using a slightly modified conventional bit-swapping algorithm. The objective for the algorithm can be, for example, minimizing power consumption, minimizing cross talk, or minimizing a function of both.

An electronic system can comprise any combination of electrical components configured or configurable by software and/or firmware to perform an intended function. Electronic components include hardware. Examples of hardware include logic devices, analog circuits, and electrical connectors. An electronic subsystem is an electronic system performing a subsidiary function or a subset of functions performed by an electronic system comprising the subsystem.

A data stream is a continuous or periodic flow of information reducible to a sequence of bits. The medium and format of a data stream may change as the data is transported, although the information content remains the same. Dummy data is meaningless information that is stored in the same format as used for meaningful or genuine information in a data stream.

A transceiver is an electronic system for sending and receiving data. The transceivers use in the examples are full duplex devices, but the inventors' concepts are applicable to other types of devices as well. An exemplary transceiver is a DSL modem.

A modulator is an electronic subsystem configured to convert digital data into an analog signal, such as a sequence of DMT symbols. A de-modulator is an electronic subsystem configured to convert an analog signal to digital data.

A FEC encoder is an electronic subsystem configured to apply an algorithm to a block of data to generate a group of redundant bits that can be used to check the integrity of a copy of the data block and correct one or more errors in the copied data. An FEC decoder is an electronic subsystem configured to use the redundancy bits to check the integrity of the data and correct up to a limited number of errors.

An interleaver is an electronic subsystem configured to reorder a sequence of FEC codewords, whereby the contents of the various codewords are interleaved and bytes of individual codewords are spaced apart in a data stream. A de-interleaver is an electronic subsystem configure to reassemble codewords from a data stream in which the codewords have been interleaved.

The process of interleaving generally comprises writing codewords to a memory in one order and reading them from that memory in another. The sequence in which bytes are written and the sequence in which bytes are read can define an interleaver's function. Skipping a series of bytes in a normal write sequence is a convenient way of inserting dummy bytes, provided the contents of the bytes are immaterial. Skipping a series of bytes in a normal read sequence is a convenient way of removing dummy bytes, where appropriate.

Although the inventors' concepts are described herein primarily with reference to DSL systems, it should be understood that these concepts can be employed in conjunction with any type of communication system where bit-rates can affect delay times. Where the dummy data is transmitted, application is generally limited to frequency division duplexed multi-carrier communication systems, including DSL multi-carrier communication system employing DMT modulation and wireless communication systems employing orthogonal frequency division multiplexing (OFDM). Where the dummy data is not transmitted, the applicability is broader and includes communication systems employing quadrature amplitude modulation (QAM) over a single frequency band and communication systems employing pulse amplitude modulation (PAM).

Delays are particularly important in two-way communication systems, but the inventor's concepts can also be applied to one-way communication systems if delays cause by block processing are important. The insertion of dummies has so far been described for communications in one direction, but is readily applied for communications in each direction.

The inventors concepts are generally employed to mitigate, rather than entirely eliminate, variations in transmission time delay caused by variations in bit rate. In general, dummy data is inserted periodically and in byte-length or multiple byte-length blocks. For example, in a typical implementation, if the bit-rate drops by a factor of 2.1 from its peak value where no dummy bytes are used, following the drop, every other block would be a dummy block and the delay would vary by about 5%. Optionally, changes in bit rates are taken by convenient steps, whereby dummies can be inserted to eliminate variations in latency.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the inventors' concepts. In addition, while a particular feature of a concept may have been disclosed with respect to only one of several concepts, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of mitigating a communication lag time variation in a DSL communication system, caused by a first DSL modem, comprising, interspersing dummy data with a variable bit rate first data stream to form a combined data stream, using hardware;

supplying the first data stream to an electronic subsystem of the first DSL modem;

wherein a rate at which the dummy data is supplied increases in response to a decrease in the bit-rate for the first data stream;

whereby an increase in the communication lag time resulting from the decrease in the bit-rate is mitigated or avoided by the addition of the dummy data;

transmitting the combined data stream over a line; and separating the first data stream from the combined data stream;

whereby the first data stream is recovered and the dummy data is discarded following transmission over the line;

wherein the electronic communication system uses frequency division duplexing and at least part of the dummy data is selectively transmitted on different frequencies from data of the first data stream; and wherein an error rate for transmission at the frequencies at which only dummy data is transmitted is allowed to be much greater than an error rate at the frequencies at which data of the first data stream is transmitted.

2. The method of claim 1, wherein the electronic subsystem is an interleaver.

3. The method of claim 2, wherein the dummy data is passed through at least one additional electronic subsystem prior to transmission over the line.

4. The method of claim 3, wherein the additional electronic subsystem is a forward error correction encoder.

5. The method of claim 1, wherein an average power level for the frequencies on which only dummy data is transmitted is at least one order of magnitude less than an average power level for the frequencies on which the first data stream is transmitted.

6. The method of claim 1, wherein an average power level for the frequencies on which the first data stream is transmitted is substantially reduced shortly after increasing the rate at which the dummy data is supplied.

7. A DSL communication system adapted to operate according to the method of claim 1.

8. The DSL system of claim 7, wherein the system provides seamless rate adaptation with forward error correction.

9. The method of claim 1, wherein the bit rate for the first data stream is varied by discrete amounts to facilitate mitigating or eliminating the delay variation using the dummy data.

* * * * *